United States Patent
Quandt et al.

(10) Patent No.: US 7,535,217 B2
(45) Date of Patent: May 19, 2009

(54) FORCE SENSOR ARRAY HAVING MAGNETOSTRICTIVE MAGNETORESISTIVE SENSORS AND METHOD FOR DETERMINING A FORCE

(75) Inventors: Eckard Quandt, Bonn (DE); Manfred Ruehrig, Eckental (DE); Stephan Schmitt, Munich (DE); Bernhard Winkler, Munich (DE); Joachim Wecker, Röttenbach (DE); Juergen Zimmer, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 546 days.

(21) Appl. No.: 11/369,274

(22) Filed: Mar. 7, 2006

(65) Prior Publication Data

US 2006/0246271 A1 Nov. 2, 2006

(30) Foreign Application Priority Data

Mar. 7, 2005 (DE) .................... 10 2005 010 338

(51) Int. Cl.
*G01B 7/16* (2006.01)
*G01L 5/00* (2006.01)
*G01L 7/08* (2006.01)

(52) U.S. Cl. .............. 324/207.2; 73/862.68; 73/862.69

(58) Field of Classification Search .............. 324/207.2; 73/862.68, 862.69
See application file for complete search history.

(56) References Cited

U.S. PATENT DOCUMENTS

| 5,856,617 | A | * | 1/1999 | Gurney et al. .................. 73/105 |
| 6,883,384 | B2 | * | 4/2005 | Takada et al. .................. 73/779 |
| 2004/0216534 | A1 | | 11/2004 | Ruhrig et al. |

FOREIGN PATENT DOCUMENTS

DE 199 49 714 4/2001
DE 102 14 946 10/2003

* cited by examiner

*Primary Examiner*—Evan Pert
(74) *Attorney, Agent, or Firm*—Dicke, Billig & Czaja, PLLC

(57) ABSTRACT

The invention relates to a force sensor having a layer sequence for determining a force acting on the layer sequence along a predefined force axis. The layer sequence includes, arranged successively in a vertical direction, a first magnetic layer with a first magnetization direction, a separating layer and a second magnetic layer with a second magnetization direction. Here, the first magnetization direction is secured with respect to the layer sequence. The second magnetic layer has a magnetostriction constant that is different from zero and a uniaxial magnetic anisotropy with an anisotropy axis. The uniaxial magnetic anisotropy is generated using shape anisotropy. The second magnetization direction encloses an angle of more than 0° and less than 90° with the force axis in the quiescent state, and the anisotropy axis encloses an angle of more than 0° and less than 90° with the force axis.

24 Claims, 7 Drawing Sheets

FORCE SENSOR ARRAY HAVING MAGNETOSTRICTIVE MAGNETORESISTIVE SENSORS AND METHOD FOR DETERMINING A FORCE

CROSS-REFERENCE TO RELATED APPLICATIONS

This Utility Patent Application claims priority to German Patent Application No. DE 10 2005 010 338.3, filed on Mar. 7, 2005, which is incorporated herein by reference.

BACKGROUND

One embodiment of the present invention relates to a force sensor array having magnetostrictive multilayer sensors, and to a method for determining a force acting on the carrier of a force sensor array. Such force sensor arrays are used, for example, for determining a pressure which deforms the diaphragm of a pressure sensor.

Magnetostrictive magnetoresistive layer systems make use of the effect according to which their electrical resistance changes under the influence of an external force. In particular the GMR (gigantic magnetoresistive) effect and the TMR (tunnel magnetoresistive) effect are known in this context.

Such a magnetoresistive layer system includes a layer sequence with two or more magnetic layers which each have one magnetization direction. When the layer sequence is deformed, for example under the influence of an external tensile force or compressive force, by virtue of the magnetostrictive properties of the layers, the orientation of the magnetization directions of the individual magnetic layers with respect to one another changes, which, due to the magnetoresistive effect, brings about a change in the electrical resistance of the layer sequence.

Such a layer sequence includes at least one hard magnetic first layer which serves as a reference layer, and one soft magnetic second magnetic layer which serves as a measuring layer. Each of these magnetic layers has magnetization with one magnetization direction. While the magnetization direction in the first magnetic layer is fixed with respect to the layer sequence by suitable measures, the magnetization direction of the second magnetic layer can change under the influence of an external force acting on the layer sequence, while the magnetization direction of the first magnetic layer retains its original position owing to the fact that it is fixed. As a result a change occurs in the angle enclosed by the two magnetization directions, and this thus entails a change in the electrical resistance of the layer sequence.

This effect can be used to determine the force acting on a layer sequence by determining the electrical resistance of the layer sequence.

FIG. 1 shows by way of example a typical multilayer system according to the prior art. The multilayer system includes a layer sequence 1 along with a fixing layer 3, a fixed magnetic reference layer 11, a nonmagnetic separating layer 22 and a magnetic measuring layer 12.

FIG. 2 illustrates an enlarged vertical section through a portion of the layer sequence according to FIG. 1.

The fixing layer 3 is composed, for example, of a natural antiferromagnet (IrMn, PtMn, NiO) and it gives the desired stability to the reference layer (12) which is coupled to it by direct exchange coupling (for example in external fields, "exchange bias field").

The reference layer 11 can alternatively also be embodied as what is referred to an artificial antiferromagnet. This is a layer system composed of two magnetic layers which are coupled antiferromagnetically to one another and have a nonmagnetic coupling layer between them.

The reference layer 11 is coupled antiferromagnetically to the fixing layer 3.

Given suitably selected dimensioning of the coupling strength between the fixing layer 3 and the reference layer 11, the magnetization direction M1 of the reference layer 11 is also fixed with respect to the layer system 1 and remains itself unchanged when there is a tensile force or compressive force acting on the layer system 1.

The measuring layer 12 is spaced apart from the reference layer 11 by means of a separating layer 22. The measuring layer 12 has a magnetization direction M2 which extends, for example, perpendicularly with respect to the magnetization direction M1 of the reference layer 11.

FIG. 3a shows a plan view of the layer sequence 1 which is in the quiescent state, according to FIGS. 1 and 2. Quiescent state here refers to the state in which there is no external tensile force or compressive force or external magnetic field acting on the layer sequence 1.

In this view, the perpendicular arrangement of the magnetization directions M1 and M2 of the reference layer 11 and of the measuring layer 12 with respect to one another can be seen.

However, this array for measuring an external force acting on the layer system has a serious disadvantage which will be explained below with reference to FIGS. 3b and 3c.

It is a precondition that the reference layer 11 has a negligible magnetostriction, which can be achieved technically by, for example, suitably selecting the composition of the alloy. Accordingly, the alloy does not react at all, or reacts only slightly, to external mechanical stresses. The stability in the present case is also additionally favored by the exchange coupling to the fixing layer 3.

If an external force F, for example a tensile force, acts parallel to the magnetization direction M1 of the reference layer 11 on the layer sequence 1, this force effect causes the preferred position of the magnetization direction M2 of the measuring layer 12 to change.

In the unstressed state said position was perpendicular with respect to the magnetization M1 of the reference layer 11. The preferred position of the magnetization M2 of the measuring layer is achieved by a marked degree of shape anisotropy of the layer system 1 in the xy plane.

The effect of an external force on the magnetization direction M2 of the measuring layer 12 is determined here by the direction of the force and by the sign of the magnetostriction constant $\lambda 12$ of the measuring layer 12.

If the magnetostriction constant $\lambda 12$ is greater than zero when the tensile force F is acting, the magnetization direction M2 of the measuring layer 12 exhibits a tendency to increasingly orient itself parallel to the axis C of the acting tensile force F as the magnitude of the tensile force increases (case 1).

If, in contrast to the illustration, the force F were a compressive force acting on the layer system 1, the magnetization direction M2 of the measuring layer 12 would have the tendency to orientate itself increasingly perpendicularly with respect to the axis C of the acting compressive force as the magnitude of the compressive force increases (case 2).

If the magnetostriction constant $\lambda 12$ of the measuring layer 12 is smaller than zero with the tensile force F is acting, its magnetization direction M2 would orientate itself increasingly perpendicularly with respect to the axis C of the acting tensile force F as the magnitude of the tensile force increases (case 3).

Furthermore, when there is a negative magnetostriction constant λ12 of the measuring layer 12 and a compressive force acting on the layer system 1, the magnetization direction M2 of the measuring layer 12 would orient itself increasingly parallel to the axis C of the acting compressive force as the magnitude of the compressive force increases (case 4).

In cases 1 and 4 it would, however, be the same in terms of energy whether the magnetization direction M2 changes by, as shown in FIG. 3b, an angle Δφ1 in, or as shown in FIG. 3c, an angle Δφ2 against the direction of the acting force F owing to the tensile force F acting on the layer system 1 starting from its quiescent position illustrated in FIG. 3a. The decisive factor is that the magnetization direction M2 preferably rotates in the direction of the axis of tensile stress in both cases shown in FIGS. 3b and 3c.

In the case in FIG. 3b, the magnetization directions M1 and M2 of the reference layer 11 or measuring layer 12 enclose an angle φ1 which is smaller than the angle φ2, between the magnetization directions M1, M2 of the reference layer 11 and of the measuring layer 12 in the case in FIG. 3c.

As the magnitude of the tensile force F increases, an antiparallel orientation of the magnetization directions M1, M2 would be brought about in the borderline case of infinitely high acting force in FIG. 3b, and a parallel orientation of the magnetization directions M1, M2 would be brought about in the borderline case of infinitely high acting force in FIG. 3c.

Since the electrical resistance of the layer sequence 1 depends on the cosine of the angle φ1 in FIG. 3b or φ2 in FIG. 3c, which is enclosed by the magnetization directions M1, M2 of the reference layer 11 and measuring layer 12, the layer sequence has a different electrical resistance in the case in FIG. 3b than in the case in FIG. 3c although the same external tensile force F acts on the layer sequence 1 in both cases.

Furthermore, under the conditions described in cases 2 and 3, the preferred orientation of the magnetization direction of the measuring layer 12 would point in a direction perpendicular with respect to the acting force F (or its axis C). However, since the initial position (FIG. 3a) is distinguished by the perpendicular orientation of M1 and M2, there would be no change in the preferred orientations, and thus also no change in resistance.

SUMMARY

One embodiment of the present invention provides a method for manufacturing a force sensor with a layer sequence, in which the angle that the magnetization directions of adjacent magnetic layers enclose is uniquely defined when a predefined external force acts on the layer sequence.

The force sensor according to one embodiment of the invention has a layer sequence and is used to determine a force acting on the layer sequence along a predefined force axis.

In the layer sequence, a reference layer with a first magnetization direction, a separating layer and a measuring layer with a second magnetization direction are arranged successively in a vertical direction. Here, the magnetization direction of the reference layer is fixed with respect to the layer sequence. Such fixing may be carried out, for example, by using an antiferromagnetic fixing layer which is known from the prior art.

The measuring layer has uniaxial magnetic anisotropy using shape anisotropy with an anisotropy axis. In the quiescent state of the layer sequence, that is, when there is no external force or external magnetic field acting on the layer sequence and when there is no electric current flowing through the layer sequence, the magnetization direction of the measuring layer encloses an angle of more than 0° and less than 90° with the force axis. Furthermore, the anisotropy axis encloses an angle of more than 0° and less than 90° with the force axis.

On the one hand, the quiescent position of the magnetization of the first layer when there is no external mechanical stress on the layer sequence is given by the direction of the shape anisotropy. The layer sequence, and thus also the measuring layer, in one case have an elongated shape with a uniaxial shape anisotropy, and correspondingly an anisotropy axis which is identical to the longitudinal axis of the second magnetic layer, and thus to the longitudinal axis of the layer sequence. According to one embodiment of the invention, said anisotropy axis is between 0 and 90° in relation to the fixed magnetization of the second layer.

The quiescent position is also determined by the type and strength of the coupling between the reference layer and the measuring layer. Both can be set by the distance between the reference layer and the measuring layer, and thus also by the thickness of a separating layer arranged between said layers, in conjunction with the RKKY (Rudermann Kittel Kasuya Yosida) coupling which applies to the system.

Depending on the selected distance between the first and second magnetic layers, they couple ferromagnetically or antiferromagnetically. Provided that there are no other inference forces acting, the magnetization direction of the measuring layer is parallel to the magnetization direction of the reference layer in the case of ferromagnetic coupling, and antiparallel to the magnetization direction of the reference layer in the case of antiferromagnetic coupling.

The magnetization direction of the measuring layer generally assumes an equilibrium position which is determined by the type and strength of the magnetic coupling between the measuring layer and the reference layer and by the shape anisotropy of the measuring layer.

In one embodiment of present invention, the strength of the magnetic coupling between the reference layer and the measuring layer is preferably selected to be so weak that in the quiescent state the magnetization direction of the measuring layer is oriented essentially parallel to the anisotropy axis predefined by the shape anisotropy.

The prevailing shape anisotropy produces a restoring force that causes a magnetization direction that is deflected from its quiescent position by the influence of an external force on the layer sequence to assume again a defined quiescent position parallel to the anisotropy axis after the cessation of the external force.

In the quiescent position, the layer sequence has an electrical resistance that is determined by the cosine of the angle that is enclosed by the magnetization directions of the measuring layer and reference layer.

The influence of an external tensile force or compressive force on the layer sequence causes the magnetization direction of the measuring layer to be deflected out of its quiescent position, while the magnetization direction of the reference layer remains unchanged owing to the fact that it is fixed, with the result that the angle between the magnetization directions of the measuring layer and reference layer, and thus also the electrical resistance of the layer sequence, change.

This effect can be used to determine the force acting on such a layer sequence from the electrical resistance of said layer sequence.

In order to obtain a large difference between the electrical resistances of a layer sequence between its quiescent state and the state in which a specific external force acts on the layer sequence, a large change in the angle between the magnetization directions of the reference layer and of the measuring layer is correspondingly necessary.

On the premise of a defined preferred direction in which the magnetization direction of the measuring layer attempts to set itself under the influence of an external tensile force or compressive force, the maximum achievable change in the angle between the magnetization directions of the reference layer and of the measuring layer is between 0° and 90°.

If the measuring layer has a positive magnetostriction constant, a tensile force acting on the layer sequence brings about an orientation of the magnetization direction of the measuring layer toward the axis of the acting force, and toward an axis perpendicular to the acting force when there is a compressive force.

If the measuring layer contrastingly has a negative magnetostriction constant, a compressive force acting on the layer sequence brings about an orientation of the magnetization direction of the measuring layer toward the axis of the acting force, and toward an axis perpendicular with respect to the acting force when there is a tensile force.

A very wide variety of combinations of the predefined force axis, orientation of the anisotropy axis, magnetization direction of the reference layer and magnetization direction of the measuring layer in the quiescent position can be generated from these conditions.

In order to achieve the greatest possible change in the electrical resistance of the layer sequence under the influence of an external force given a positive magnetostriction constant of the measuring layer, in one case of a tensile force, the force axis of the tensile force encloses an angle of somewhat less than 90°, but in one case more than 60°, with the quiescent position of the magnetization direction of the measuring layer. In one case of a compressive force, the force axis of the compressive force encloses an angle of somewhat more than 0°, but in one case less than 30°, with the quiescent position of the magnetization direction of the measuring layer.

Correspondingly, a large change occurs in the electrical resistance of the layer sequence under the influence of an external force given a negative magnetostriction constant of the measuring layer in the case of a tensile force if the force axis of the tensile force encloses an angle of somewhat more than 0° but in one case less than 30°. In once case of a compressive force, the force axis of the compressive force encloses an angle of somewhat less than 90° but in one case more than 60° with the quiescent position of the magnetization direction of the measuring layer.

A series connection of a first layer sequence whose electrical resistance increases under the influence of an external force, and a second layer sequence whose electrical resistance decreases under the influence of an external force, can be used in bridge circuits, for example, half bridges or full bridges.

If one or more such layer sequences are arranged on the diaphragm of a pressure sensor, generally locally different forces act on each layer sequence in terms of their direction and/or magnitude when the diaphragm is distorted. Given a suitable arrangement of the layer sequences, it is thus possible to determine a pressure acting on the diaphragm of the pressure sensor by evaluating the electrical resistances of the layer sequences.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
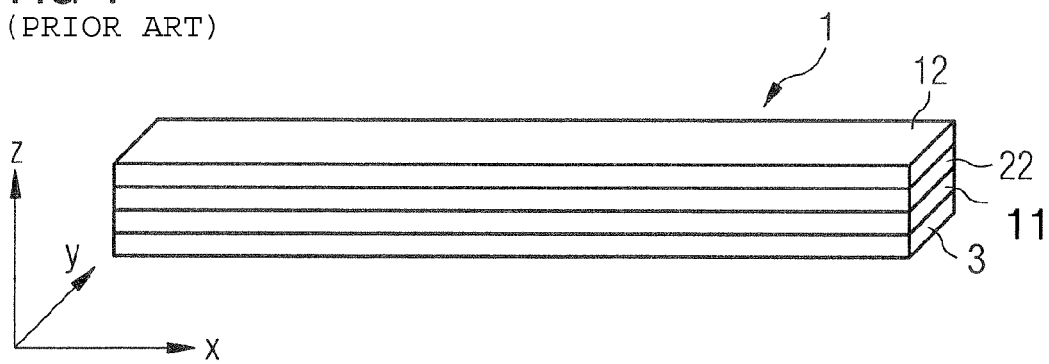
FIG. 1 illustrates a layer sequence according to the prior art in a perspective view.
Figure 4A:
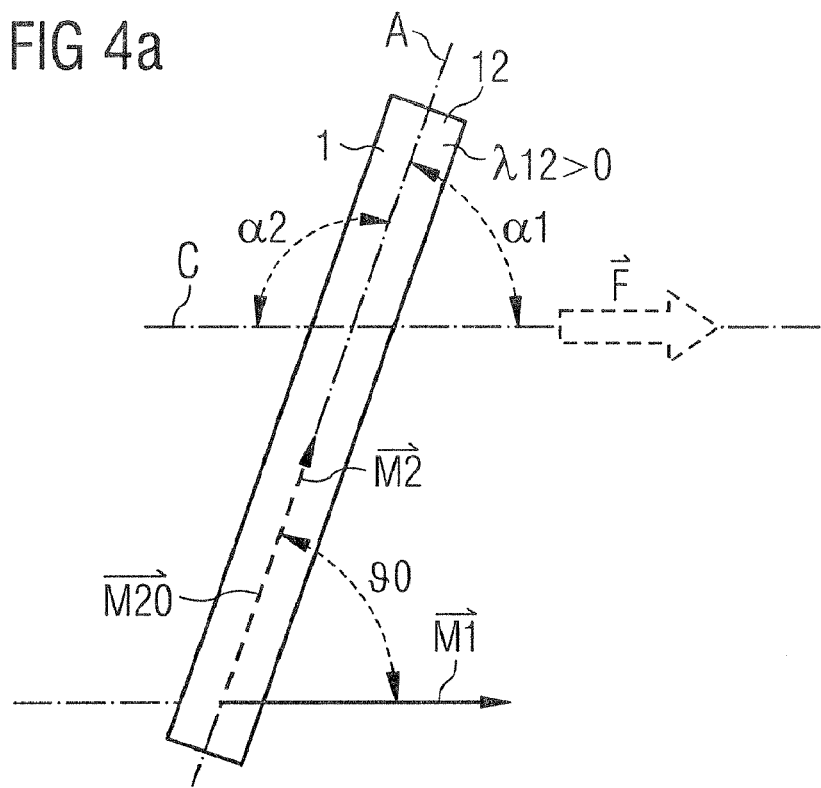
FIG. 4a illustrates an array according to one embodiment of invention which is in the quiescent state and has the purpose of determining a force acting on a layer sequence, the measuring layer having a magnetic anisotropy axis which encloses an angle of somewhat less than 90° with the axis of the acting force.

FIG. 4a illustrates a plan view of an array according to one embodiment of the invention for determining an external force acting on a layer sequence 1 in the quiescent state, that is, in the illustrated state no external forces or magnetic fields are acting on the layer sequence 1. The structure of the layers corresponds to the structure already known from FIG. 1.

In the illustrated plan view, only the measuring layer 12 can be seen. The measuring layer 12 has a magnetization direction M2 and a positive magnetostriction constant λ12. A reference layer is arranged under the measuring layer 12, spaced apart from it.

The reference layer has a magnetization direction M1 which is fixed with respect to the layer sequence, that is, its position does not change, or changes only insignificantly, when an external force is acting on the layer sequence 1.

The layer sequence 1 is embodied in an elongate fashion and has a ratio of length to width of more than 2:1, and in one case of more than 5:1. This results in a uniaxial magnetic anisotropy axis A, parallel to which the magnetization direction M2 of the second magnetic layer 12 is oriented in the quiescent state. The magnetization direction M2 of the measuring layer 12 is thus in its quiescent position M20.

The layer sequence 1 is provided for determining an external force F, which can act along a predefined force axis C. The layer sequence 1 according to FIG. 4a is in the quiescent state and there is no external force acting. A force F which is potentially acting in the direction of the force axis C is illustrated only for the sake of explanation and therefore only by dashed lines. The force F may be, as illustrated, a tensile force or, as not illustrated, a compressive force.

The anisotropy axis A encloses an angle α1 somewhat less than 90°, but in one case more than 60°, with the force axis C. Alternatively, the supplementary angle α2 which is associated with α1 could also be less than 90°, but in one case more than 60°.

According to one embodiment of the invention, the magnetization direction M1 of the first magnetic layer is oriented parallel to the force axis C.

Alternatively, according to a further embodiment (not illustrated) the magnetization direction M1 of the reference layer can be oriented perpendicularly with respect to the force axis C.

However, basically any magnetization direction M1 of the reference layer with respect to the layer sequence 1 or the anisotropy axis A can be selected.

In the quiescent state of the layer sequence 1 illustrated in FIG. 4a, the magnetization directions M1 and M2 of the reference layer and of the measuring layer enclose an angle σ0. This angle σ0 defines the electrical resistance which the layer sequence 1 has in the quiescent state. Since the magnetization direction M1 of the reference layer is selected such that it is parallel to the force axis C in the illustrated exemplary embodiment, the angle σ0 is identical to the angle α1.

Figure 4B:
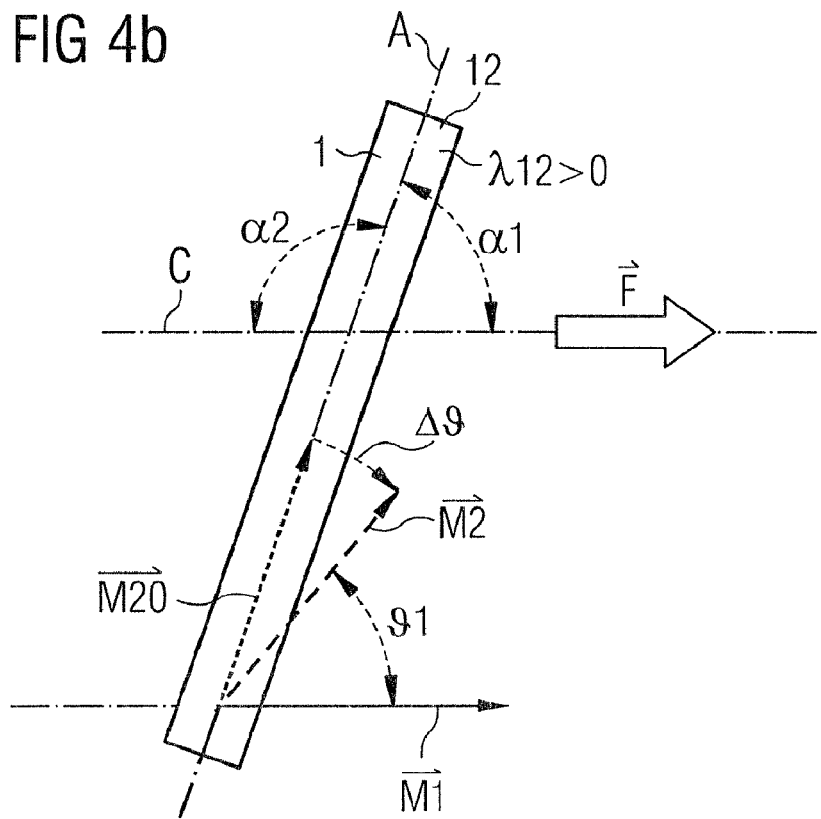
FIG. 4b illustrates the array according to FIG. 4a with an external tensile force acting on the layer sequence.

FIG. 4b illustrates the layer sequence 1 according to FIG. 4a with an external force F acting in the tensile direction. Owing to the positive magnetostriction constant λ12 of the second magnetic layer 12, the magnetization direction M2 of the measuring layer 12 is increasingly oriented parallel to the force axis C as the magnitude of the force F increases. Since the angle α1 between the force axis C and the anisotropy axis A is different from 90°, the magnetization direction M2 of the measuring layer 12 changes its position in such a way that the angle σ0, present in the quiescent state according to FIG. 4a, between the magnetization directions M1 and M2 of the reference layer and the measuring layer under the effect of the tensile force F according to FIG. 4b decreases to an angle σ1.

Owing to the angle between the force axis C and the anisotropy axis A which differs from 90°, the change in position of the magnetization direction M2, which is parallel to the anisotropy axis A in the quiescent state, of the measuring layer 12 occurs in a uniquely determined preferred direction.

The change in the angle which is illustrated in FIGS. 4a and 4b, between the magnetization directions M1 and M2 of the reference layer and of the measuring layer would take place in the same way if the magnetostriction constant λ12 of the second magnetic layer 12 were negative, and if, instead of a tensile force F, a compressive force which was opposed to it were to act on the layer sequence 1.

Figure 5A:
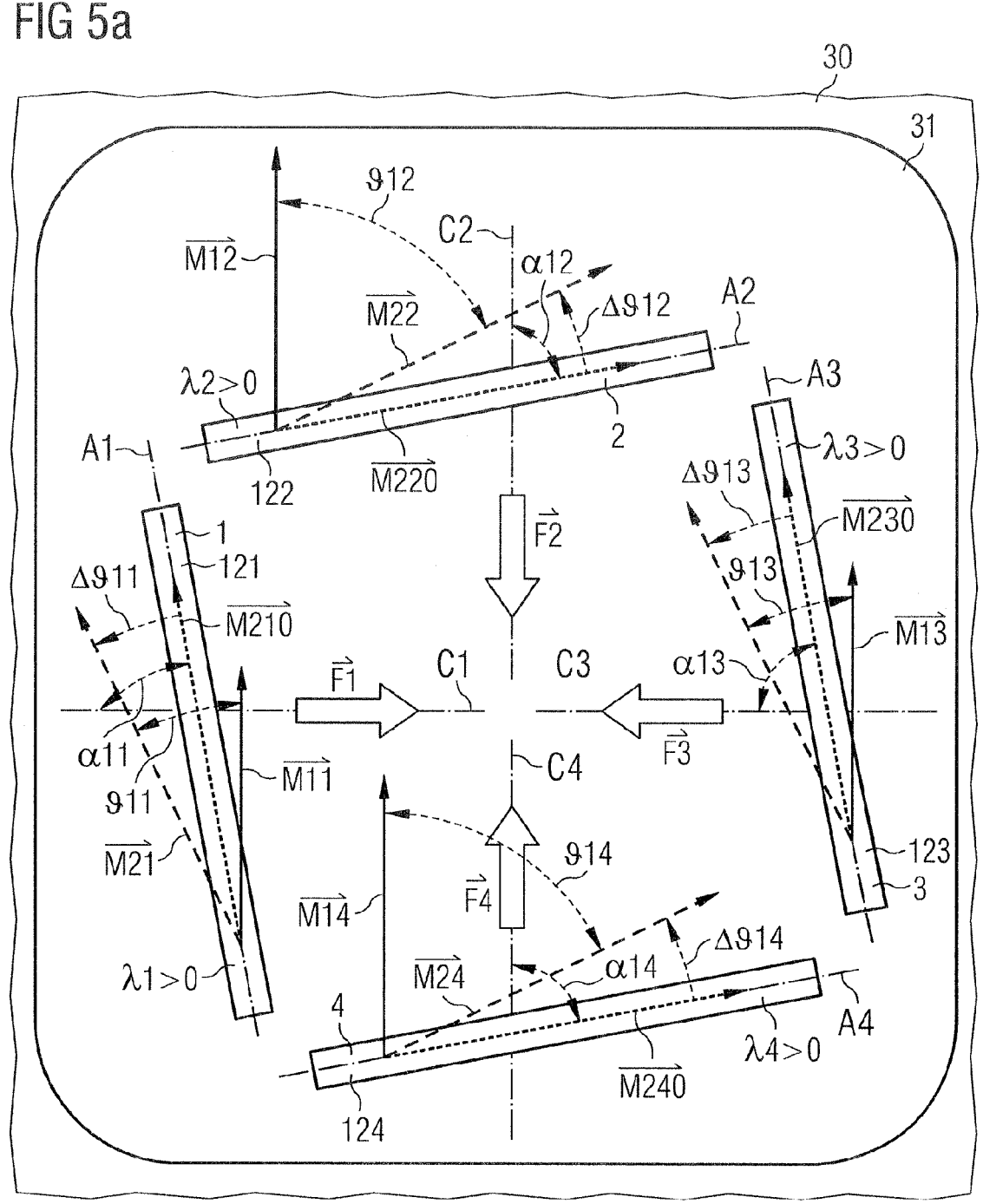
FIG. 5a illustrates four layer sequences which are arranged on the diaphragm of a pressure sensor, are connected to form a Wheatstone bridge and have the purpose of determining the pressure acting on the diaphragm.

FIG. 5a illustrates an array with four layer sequences 1, 2, 3, 4 on the diaphragm 31 of a pressure sensor. The diaphragm 31 itself is arranged on a diaphragm carrier 30.

The layer sequences 1, 2, 3, 4 each include a reference layer and a measuring layer 121, 122, 123, 124 spaced apart from it by means of a separating layer.

The reference layers have magnetization directions M11, M12, M13, M14 which are fixed in relation to the respective layer sequence 1, 2, 3, 4. According to one embodiment, the magnetization directions M11, M12, M13, M14 of the reference layers are identical and therefore can be manufactured or magnetized together, which simplifies the manufacturing method.

In contrast, the measuring layers 121, 122, 123, 124 have magnetization directions M21, M22, M23, M24 which change their position when an external force acts on the respective layer sequence 1, 2, 3, 4.

In the present exemplary embodiment, the diaphragm 31 is essentially square in design and therefore has a rotational symmetry about a fourth order rotational axis. If a force, for example an air pressure or liquid pressure, acts on the diaphragm 30, it deforms. The deformation gives rise to locally different stresses on the diaphragm 31.

Owing to the fourth order rotational symmetry, local forces F1, F2, F3, F4 with force axes C1, C2, C3, C4 occur at different, corresponding locations which are also arranged in a rotationally symmetrical fashion with respect to one another, with the result that the force F1 acts on the first layer sequence 1, the force F2 on the second layer sequence 2, the force F3 on the third layer sequence 3 and the force F4 on the fourth layer sequence 4. The forces F1, F2, F3, F4 have equal magnitudes, owing to the symmetry, but different directions.

The layer sequences 1, 2, 3, 4 are embodied in an elongate fashion, and also arranged in a rotationally symmetrical fashion with respect to one another. Their two magnetic layers 121, 122, 123, 124 have anisotropy axes, A1, A2, A3 and A4. Furthermore, the layer sequences 1, 2, 3, 4 have longitudinal axes which are identical to the respective anisotropy axes A1, A2, A3, A4 of the relevant second magnetic layers 121, 122, 123, 124.

The longitudinal axis, and thus the anisotropy axis A1, A2, A3, A4 of each of the layer sequences 1, 2; 3, 4 encloses an angle α11, α12, α13, α14 of more than 0° and less than 90° with the respective, locally present force axis C1, C2, C3, C4.

The longitudinal, and thus anisotropy axes A1, A3 of the first and third layer sequences 1, 3 are oriented parallel to one another. Correspondingly, the longitudinal or anisotropy axes A2, A4 of the second and fourth layer sequence 2, 4 are also oriented parallel to one another.

In the first and third layer sequences 1, 3, the angles α11, α13, between the local force axes C1, C3 and the corresponding longitudinal or anisotropy axes A1, A3 are in one case more than 0° and less than 30°. In the second and fourth layer sequences 2, 4, the angles α12, α14 between the local force axes C2, C4 and the corresponding longitudinal or anisotropy axes A2, A4 are in one case more than 60° and less than 90°.

In the present exemplary embodiment, the measuring layers 121, 122, 123, 124 have positive magnetostriction constants λ1, λ2, λ3, λ4, while at the same time the local forces F1, F2, F3, F4 act on the respective layer sequence 1, 2, 3, 4 as tensile forces.

As a result, the magnetization directions M21, M22, M23, M24 of the measuring layers 121, 122, 123, 124 are deflected out of their quiescent positions M210, M220, M230, M240, provided by the shape anisotropy of the measuring layers 121, 122, 123, 124, by angles Δσ11, Δσ12, Δσ13, Δσ14. As a result, the angles σ11, σ13 which the magnetization directions M11, M13 with their reference layers enclose with the magnetization directions M21 or M23 of their measuring layers 121, 123 in the first and third layer sequences 1, 3 become larger. This causes the electrical resistances of the first and third layer sequences 1, 3 to increase.

In contrast, in the second and fourth layer sequences 2, 4 the angles σ12, σ14 which the magnetization directions M12, M14 of their reference layers enclose with the magnetization directions M22 or M24 with their measuring layers 122, 124 become smaller. This causes the electrical resistances of the second and fourth 2, 4 layer sequences to drop.

With the present array, the same deflections of the magnetization directions M21, M22, M23, M24 of the measuring layers 121, 122, 123, 124 and the same changes in the electrical resistances of the layer sequences 1, 2, 3, 4 would occur if the magnetostriction constants λ1, λ2, λ3, λ4 of the measuring layers 121, 122, 123, 124 were negative, and if at the same time the local forces F1, F2, F3, F4 were to act on the respective layer sequence 1, 2, 3, 4 as compressive forces.

Figure 5B:
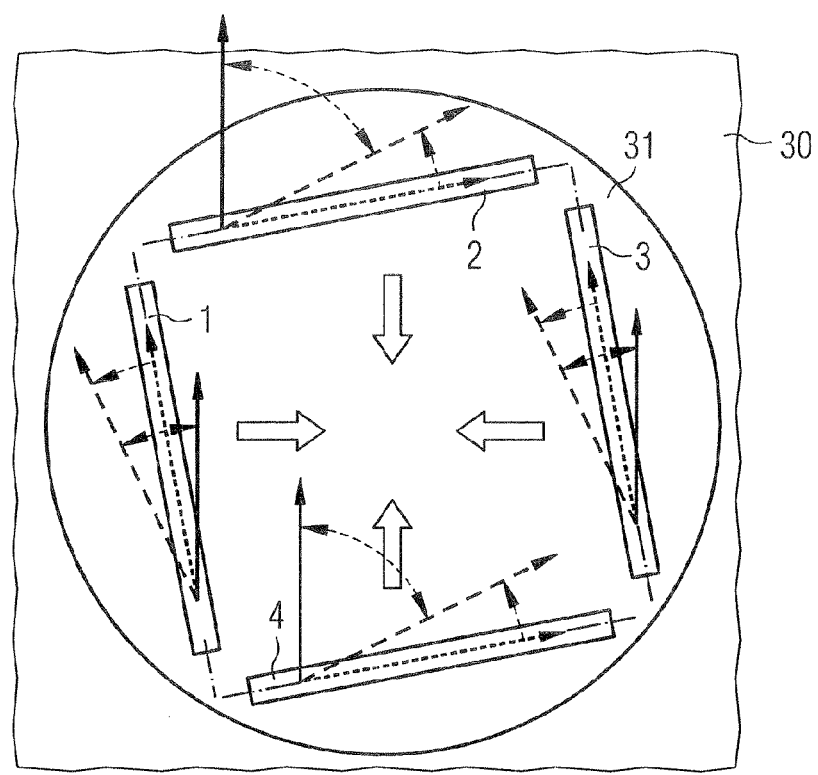
FIG. 5b illustrates the array according to FIG. 5a, with the diaphragm being of circular design.
Figure 5C:
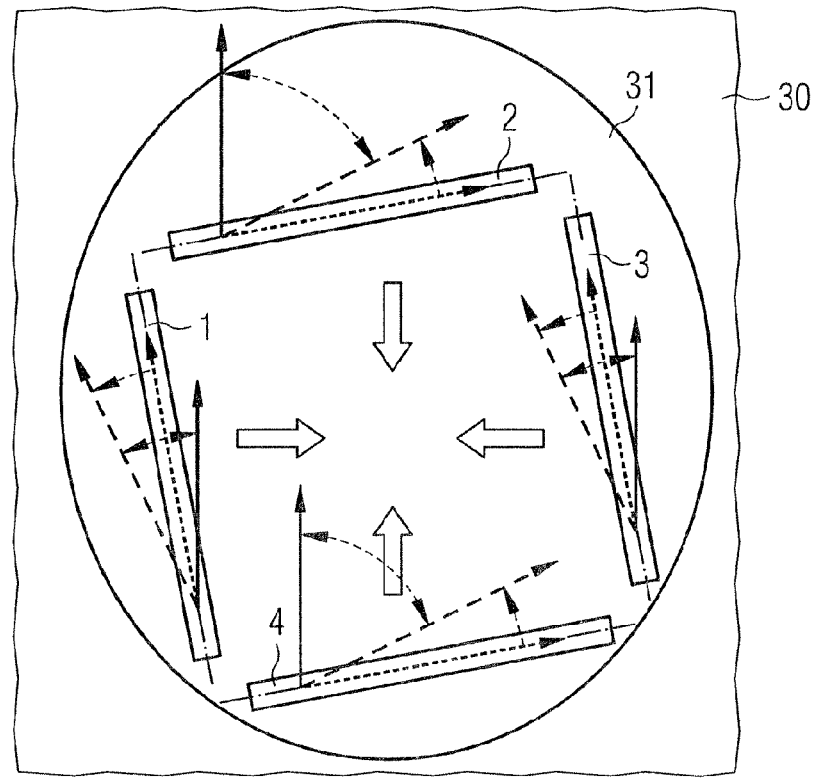
FIG. 5c illustrates the array according to FIGS. 5a and c, with the diaphragm being of oval design.

FIGS. 5b and 5c illustrate arrangements according to FIG. 5a, the diaphragm 31 being of circular design in FIG. 5b and of oval design in FIG. 5c.

The forces acting on the layer sequences 1, 2, 3, 4 in the arrays according to FIGS. 5a, 5b, 5c, and thus a pressure which deforms the diaphragm 31, can be determined by determining the electrical resistances of the layer sequences 1, 2, 3, 4.

Figure 6:
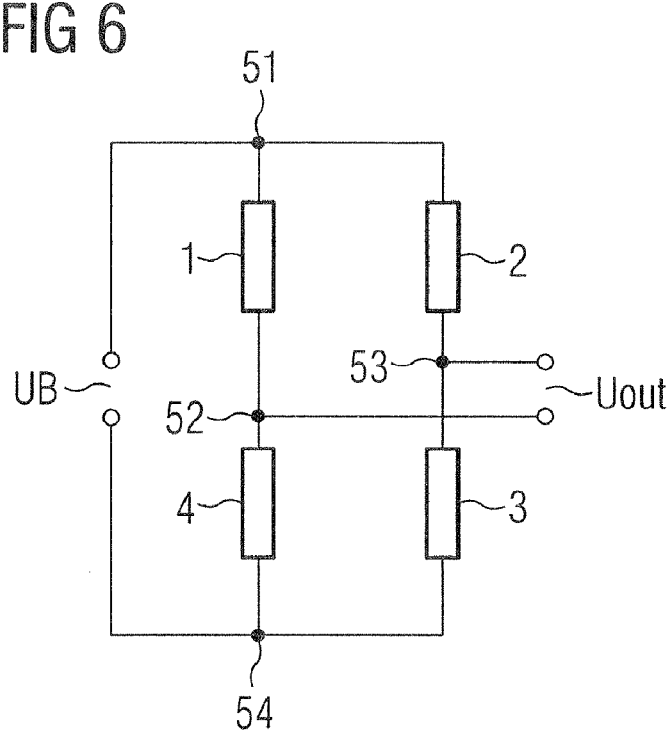
FIG. 6 illustrates four layer sequences which are connected to form a Wheatstone bridge.

As is shown in FIG. 6, this occurs by means of a Wheatstone bridge to which the layer sequences 1, 2, 3, 4 are connected. Such a bridge circuit permits temperature-related and aging-related changes as well as fabrication-related variation in the electrical resistance of the layer sequences 1, 2, 3, 4 to be compensated. A precondition for this is good thermal coupling of the layer sequences 1, 2, 3, 4 so that they have at least approximately the same temperature.

In this context, the first layer sequence 1 is connected to a first connecting point 51 and to a second connecting point 52, the second layer sequence 2 is connected to the first connecting point 51 and to a third connecting point 53, the third layer sequence 3 is connected to the third connecting point 53 and to a fourth connecting point 54, and the fourth layer sequence 4 is connected to the second connecting point 52 and to the fourth connecting point 54. The first layer sequence 1 is thus connected electrically in series with the fourth layer sequence 4, and the second layer sequence 2 is thus connected electrically in series with the third layer sequence 3.

If a supply voltage UB is connected to the first and fourth connecting points 51, 54 of the bridge, an output voltage Uout which is a measure of the force acting on the diaphragm 31 or the pressure acting on the diaphragm 31 is present between the second and third connecting points 52, 53.

Figure 7:
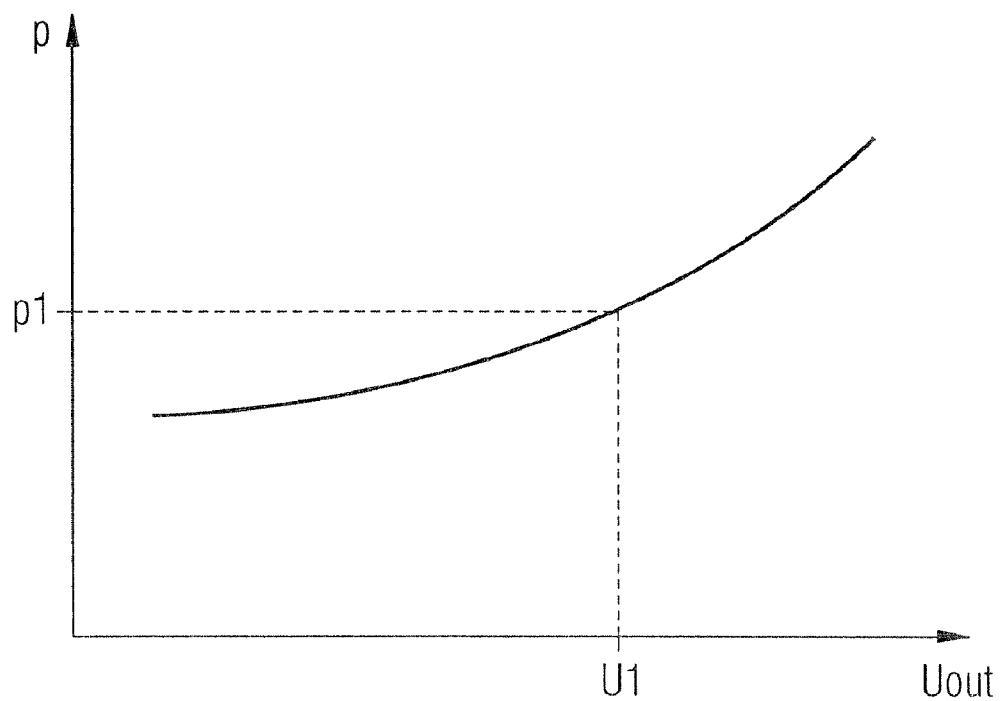
FIG. 7 illustrates a characteristic curve of a pressure sensor with a Wheatstone bridge according to FIG. 6.

FIG. 7 illustrates a characteristic curve that represents the relationship between the output voltage Uout and the pressure acting on the diaphragm of a pressure sensor. By determining the output voltage U1 of such a bridge it is possible to use this characteristic curve to infer the assigned pressure p1. In the same way it is possible to infer the force assigned to the output voltage Uout from a characteristic curve which the relationship between the output voltage Uout and the force acting on the diaphragm of a pressure sensor from a measured output voltage.

Figure 8:
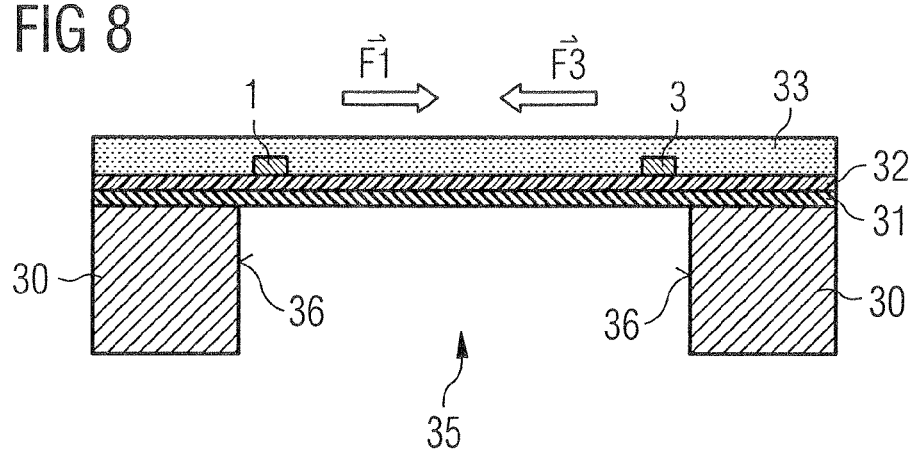
FIG. 8 illustrates a cross section through the diaphragm region of a pressure sensor which is fabricated using BMM silicon technology.

In FIG. 8 there is a vertical section through the diaphragm region of a pressure sensor which is formed using BMM (Bulk Micro Mechanics) silicon technology with a diaphragm 31 on which four layer sequences, as explained in FIG. 5a, are arranged. The cross section runs through the local force axes C1, C3 of the first and third layer sequences 1, 3 in a plane perpendicular to the diaphragm 31 from FIG. 5a.

A diaphragm carrier 30 has an opening 35 which is covered by a diaphragm 31 which is formed, for example, from silicon. An insulation layer 32, on which the first and third layer sequences 1, 3 are positioned, is arranged on the diaphragm 31. The first and third layer sequences 1, 3, like the second and fourth layer sequences not illustrated, are arranged in regions in which the diaphragm 31 has its maximum extension when a pressure is applied. This region is located above the opening 35 in the diaphragm carrier 30, in one case near to the edge 36 of the opening 35.

A passivation layer 33 is applied to the insulation layer 32 and the first and third layer sequences 1, 3 as well as the second and fourth layer sequences (not illustrated).

As a function of the pressure acting on the diaphragm 31, a greater or lesser degree of bulging of the diaphragm 31 occurs and locally different forces F1, F3 thus occur.

Figure 9:
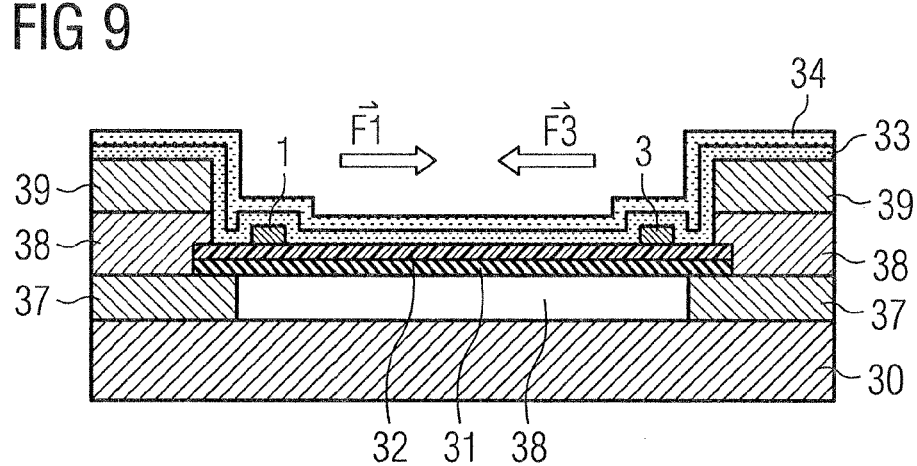
FIG. 9 illustrates a cross section through the diaphragm region of a pressures sensor which is fabricated using SMM silicon technology.

A vertical section through the diaphragm region of a pressure sensor which is manufactured using SMM (Surface Micro Mechanics) silicon technology with a diaphragm 31 on which four layer sequences as explained in FIG. 5a are arranged is illustrated in FIG. 9. The cross section passes through the local force axes C1, C3 of the first and third layer sequences 1, 3 in a plane perpendicular to the diaphragm 31 from FIG. 5a.

An approximately 0.5 µm-thick sacrificial layer 37 made of silicon oxide is arranged on the diaphragm carrier 30 which is formed by a substrate. The diaphragm 31 is composed of approximately 0.5 µm to 1.0 µm-thick polycrystalline silicon and covers a cavity 38 which is manufactured by means of a local selective etching of the sacrificial layer 37. A thin insulating layer 32 is applied to the diaphragm 31.

In the regions in which the diaphragm 31 has its maximum extension when a pressure is applied, four layer sequences are arranged in accordance with the array according to FIG. 5a, and only the first and third layer sequences 1, 3 of which are shown in the present vertical section.

An inter-metal oxide 38 and a chip passivation 39 are applied to the sacrificial layer 37. Apart from their edge region, the inter-metal oxide 38 and the chip passivation 39 have been removed above the diaphragm 31 by means of etching in order to avoid adversely affecting the mobility of the diaphragm 31. A thin passivation layer which comprises two component layers 33, 34 and which also covers the insulating layer 32 and the chip passivation 39 is also applied to the layer sequences in order to protect them.

Figure 2:
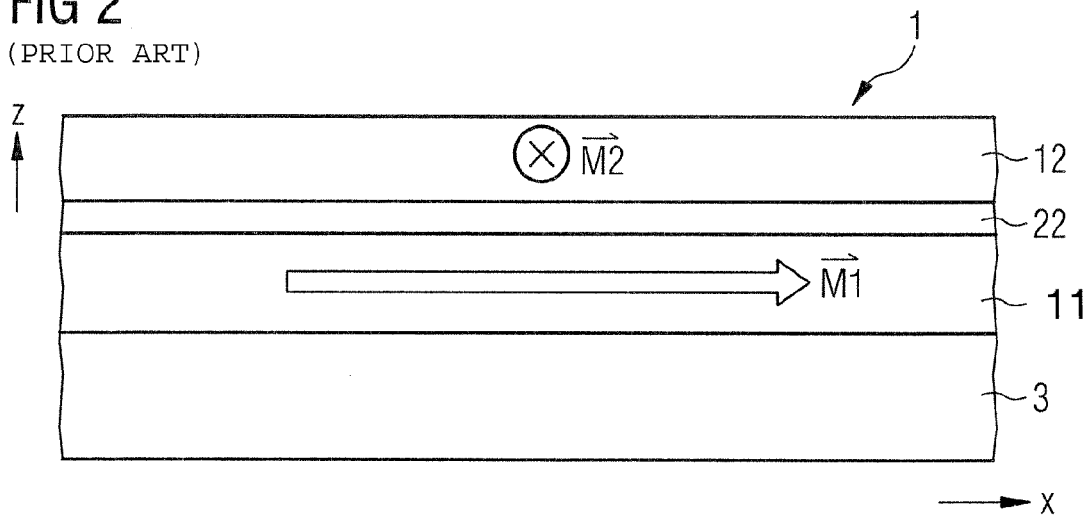
FIG. 2 illustrates a vertical section, illustrated in an enlarged form, through a layer sequence according to FIG. 1.
Figure 3A:
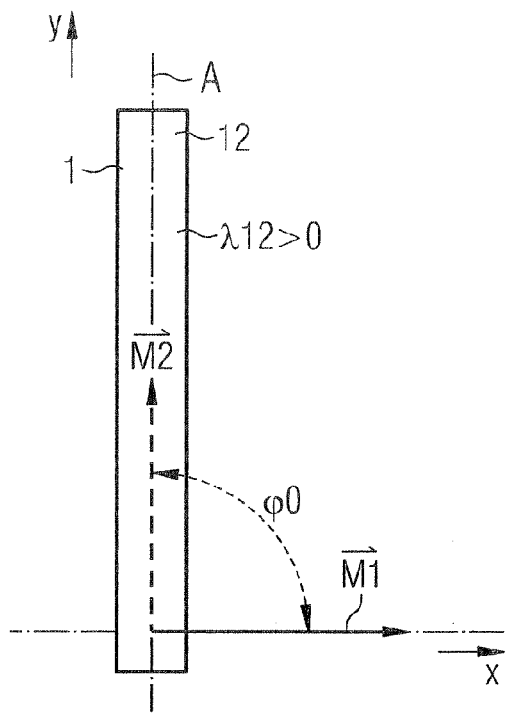
FIG. 3a illustrates an array which is in the quiescent state and has the purpose of determining a force acting on a layer sequence, according to the prior art.
Figure 3B:
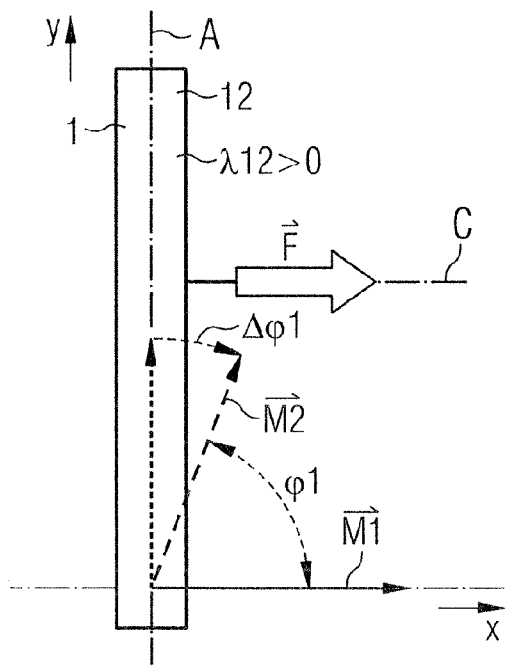
FIG. 3b illustrates the array according to FIG. 3a with an external tensile force acting on the layer sequence in which the magnetization directions of the reference layer and of the measuring layer enclose an angle.
Figure 3C:
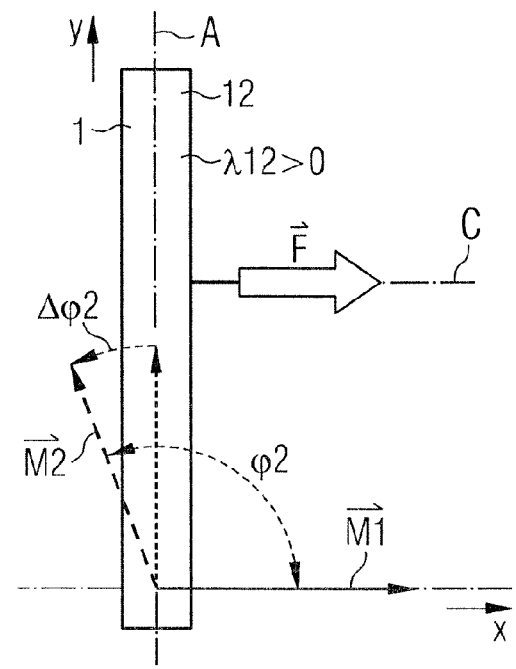
FIG. 3c illustrates the array according to FIG. 3b with the same external tensile force acting on the layer sequence, in which the magnetization directions of the reference layer and of the measuring layer enclose a different angle than in FIG. 3b.

The layer sequences 1, 2, 3, 4 according to the FIGS. 4, 5a-c, 6, 8 and 9 described above can be embodied, in particular, as GMR or TMR structures corresponding to the layer sequence according to FIG. 2.

The separating layer arranged between the first and second magnetic layers is in one case composed of non-magnetic or only weakly magnetic materials. In the case of GMR structures, the separating layer is electrically conductive and is composed, for example, of copper or copper alloy, and in the case of TMR structures it is an electrical insulator and is formed, for example, from aluminum oxide ($Al_2O_3$) or magnesium oxide (MgO).

Figure 10:
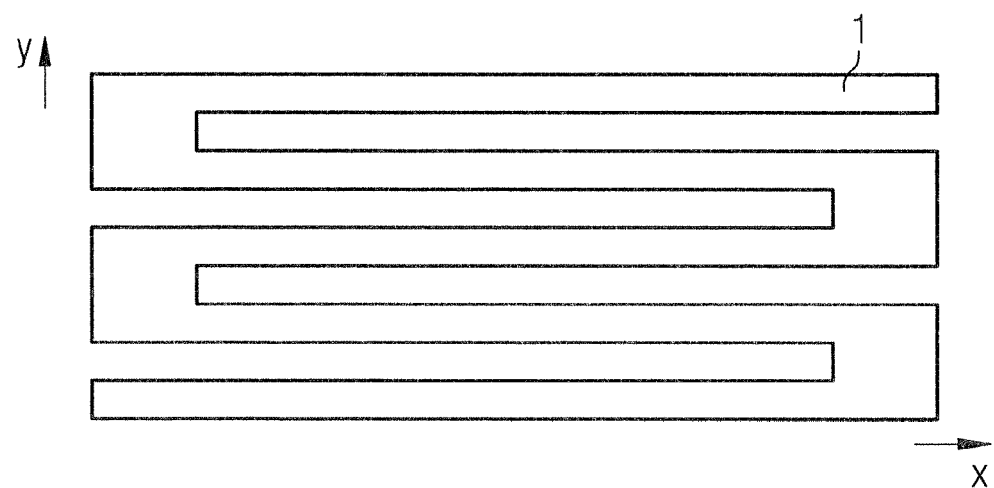
FIG. 10 illustrates a layer sequence with a meandering structure.

FIG. 10 illustrates a plan view of a layer sequence 1 with a meandering structure. With such an array it is possible to extend the effective length of the layer sequence 1 when the available space is limited.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A force sensor having a layer sequence for determining a force acting on the layer sequence along a predefined force axis, the layer sequence comprising:
   a first magnetic layer with a first magnetization direction;
   a separating layer; and
   a second magnetic layer with a second magnetization direction, the first magnetic layer, separating layer, and second magnetic layer arranged successively in a vertical direction;
   wherein the first magnetization direction is fixed with respect to the layer sequence;
   wherein the second magnetic layer has a magnetostriction constant that is different from zero;
   wherein the second magnetic layer has a uniaxial magnetic anisotropy with an anisotropy axis;
   wherein the uniaxial magnetic anisotropy is generated using shape anisotropy;
   wherein the second magnetization direction encloses an angle of more than 0° and less than 90° with the force axis in the quiescent state; and
   wherein the anisotropy axis encloses an angle of more than 0° and less than 90° with the force axis.

2. The force sensor of claim 1, wherein the anisotropy axis encloses an angle between 60° and less than 90° with the force axis.

3. The force sensor of claim 1, wherein the magnetization direction of the second magnetic layer encloses an angle of greater than 60° and less than 90° with the force axis in the quiescent state.

4. The force sensor of claim 1, wherein the magnetization direction of the second magnetic layer encloses an angle greater than 0° and less than 30° with the force axis in the quiescent state.

5. The force sensor of claim 1, wherein the second magnetic layer has a negative magnetostriction constant.

6. The force sensor of claim 1, wherein the second magnetic layer is ferromagnetically coupled to the first magnetic layer.

7. The force sensor of claim 1, wherein the second magnetic layer is antiferromagnetically coupled to the first magnetic layer.

8. The force sensor of claim 1, wherein the first magnetic layer is embodied as an artificial antiferromagnet further comprising two magnetic layers that are antiferromagnetically coupled to one another and that have a nonmagnetic coupling layer between them.

9. The force sensor of claim 7, wherein the fixing of the first magnetic layer with respect to the layer sequence is brought about by antiferromagnetic coupling of the first magnetic layer to a further magnetic layer.

10. The force sensor of claim 1, wherein the layer sequence has a meandering structure.

11. A force sensor array comprising:
   a first layer sequence of a first force sensor comprising a first magnetic layer with a first magnetization direction, a separating layer, and a second magnetic layer with a second magnetization direction, wherein the first magnetization direction is fixed with respect to the layer sequence, the second magnetic layer has a magnetostriction constant that is different from zero, the second magnetic layer has a uniaxial magnetic anisotropy with an anisotropy axis, the uniaxial magnetic anisotropy is generated using shape anisotropy, the second magnetization direction encloses an angle of more than 0° and less than 90° with the force axis in the quiescent state, and wherein the anisotropy axis enclosing an angle of more than 0° and less than 90° with the force axis;
   a second layer sequence of a second force sensor;
   wherein the first and second force sensors are arranged on a common carrier in such a way that when the carrier is deformed mechanically the first layer sequence has a higher electrical resistance than in the quiescent state, and the second layer sequence has a lower electrical resistance than in the quiescent state.

12. The force sensor array of claim 11, wherein the second layer sequence of the second force sensor further comprises a first magnetic layer with a first magnetization direction, a separating layer, and a second magnetic layer with a second magnetization direction, wherein the first magnetization direction is fixed with respect to the layer sequence, the second magnetic layer has a magnetostriction constant that is different from zero, the second magnetic layer has a uniaxial magnetic anisotropy with an anisotropy axis, the uniaxial magnetic anisotropy is generated using shape anisotropy, the second magnetization direction encloses an angle of more than 0° and less than 90° with the force axis in the quiescent state, and wherein the anisotropy axis enclosing an angle of more than 0° and less than 90° with the force axis.

13. The force sensor array of claim 12, wherein the magnetization directions of the first magnetic layers of the layer sequences of the first and second force sensor are identical.

14. The force sensor array of claim 12, wherein the anisotropy axis of the first layer sequence and the anisotropy axis of the second layer sequence are arranged essentially perpendicularly with respect to one another.

15. The force sensor array of claim 12, wherein the first layer sequence and the second layer sequence are connected electrically in series.

16. The force sensor array of claim 12 further comprising a third force sensor, and a fourth force sensor, that are arranged on a common carrier in such a way that when the carrier is deformed mechanically the layer sequence of the third force sensor has a higher electrical resistance than in the quiescent state, and the layer sequence of the fourth force sensor has a lower electrical resistance than in the quiescent state.

17. The force sensor array of claim 16, wherein an anisotropy axes of the third layer sequence and an anisotropy axes of the fourth layer sequence are arranged essentially perpendicularly with respect to one another.

18. The force sensor array of claim 17, wherein the anisotropy axes of the layer sequence of the first force sensor and the layer sequence of the third force sensor are arranged parallel to one another.

19. The force sensor array of claim 18, wherein the magnetization directions of the first magnetic layers of the layer sequences of the first, second, third and fourth force sensor are identical.

20. The force sensor array of claim 17, wherein the layer sequences of the first, second, third and fourth force sensor are embodied in an elongate fashion and are arranged along the sides of a rectangle or a square or along the circumference of an oval or a circle.

21. The force sensor array of claim 17, wherein the layer sequences of the first, second, third and fourth force sensor are in thermal contact with one another.

22. The force sensor array of claim 17, wherein the common carrier is embodied as a pressure sensor diaphragm.

23. The force sensor array of claim 17, wherein the layer sequences of the first, second, third and fourth force sensor are connected to form a Wheatstone bridge, the layer sequence of the first force sensor is connected to a first connecting point and to a second connecting point, the layer sequence of the second force sensor is connected to the first connecting point and to a third connecting point, the layer sequence of the third force sensor is connected to the third connecting point and to a fourth connecting point, and wherein the layer sequence of the fourth force sensor is connected to the second connecting point (nd to the fourth connecting point.

24. A method for determining a mechanical force acting on a carrier of a force sensor array comprising:
 providing a force sensor array, the force sensor array comprising:
  a first layer sequence of a first force sensor comprising a first magnetic layer with a first magnetization direction, a separating layer, and a second magnetic layer with a second magnetization direction, wherein the first magnetization direction is fixed with respect to the layer sequence, the second magnetic layer has a magnetostriction constant that is different from zero, the second magnetic layer has a uniaxial magnetic anisotropy with an anisotropy axis, the uniaxial magnetic anisotropy is generated using shape anisotropy, the second magnetization direction encloses an angle of more than 0° and less than 90° with the force axis in the quiescent state, and wherein the anisotropy axis enclosing an angle of more than 0° and less than 90° with the force axis;
 a second layer sequence of a second force sensor; and
 wherein the first and second force sensors are arranged on a common carrier in such a way that when the carrier is deformed mechanically the first layer sequence has a higher electrical resistance than in the quiescent state, and the second layer sequence has a lower electrical resistance than in the quiescent state;
 deforming the common carrier by means of a mechanical force acting on it;
 providing a supply voltage connected between a first connecting point and a fourth connecting point;
 determining an output voltage present between the second connecting point and a third connecting point;
 providing a characteristic curve which represents the relationship between the output voltage and the force acting on the common carrier; and
 determining the force acting on the common carrier by using the output voltage which has been determined from the characteristic curve.

* * * * *